United States Patent [19]

Reil et al.

[11] Patent Number: 5,536,163
[45] Date of Patent: Jul. 16, 1996

[54] TOOL FOR DEEP-DRAWING AND SEALING OPEN PLASTICS SHELLS

[75] Inventors: Wilhelm Reil, Bensheim; Heiko Bub, Bodenheim, both of Germany

[73] Assignee: Tetra Laval Holdings and Finance S.A., Pully, Switzerland

[21] Appl. No.: 273,760

[22] Filed: Jul. 12, 1994

[30] Foreign Application Priority Data

Jul. 20, 1993 [DE] Germany .................. 43 24 238.3

[51] Int. Cl.⁶ .................................................. B29C 65/18
[52] U.S. Cl. ........................ 425/504; 425/508; 425/388
[58] Field of Search .................................... 425/388, 503, 425/504, 507, 508; 264/248, 249, 250

[56] References Cited

U.S. PATENT DOCUMENTS

| | | | |
|---|---|---|---|
| 2,282,423 | 5/1942 | Kopitke ........................ | 264/550 |
| 3,256,565 | 6/1966 | Alesi, Jr. et al. ............. | 425/504 |
| 3,654,013 | 4/1972 | Willsie et al. ................ | 156/212 |
| 4,801,347 | 1/1989 | Garwood ....................... | 156/245 |
| 5,158,786 | 10/1992 | Reil et al. .................... | 425/341 |

FOREIGN PATENT DOCUMENTS

| | | |
|---|---|---|
| 0344331 | 12/1989 | European Pat. Off. . |
| 2256945 | 5/1973 | Germany . |
| 441721 | 8/1967 | Switzerland . |
| 1185732 | 3/1970 | United Kingdom . |

*Primary Examiner*—Robert J. Warden
*Assistant Examiner*—Theresa T. Snider
*Attorney, Agent, or Firm*—Killworth, Gottman, Hagan & Schaeff

[57] ABSTRACT

A tool for deep-drawing and sealing open plastics shells (3, 3') has a shell-like metal body (2, 2') which includes a flat edge (11, 11') at the open side. A heat insulating attachment is secured to the edge of the metal body so that the outer seam of a first plastic shell can be joined by sealing, to the outer seam of a second plastic shell oppositely disposed to it without supplying additional heat.

7 Claims, 5 Drawing Sheets

TOOL FOR DEEP-DRAWING AND SEALING OPEN PLASTICS SHELLS

BACKGROUND OF THE INVENTION

The invention relates to a tool for deep-drawing and sealing open plastic shells, whereby the tool has a substantially flat edge which at least partly encompasses the open side of the shell-shaped metal body of the tool in one plane.

It is known to make packs for liquids from deep-drawable plastic material whereby panel-shaped blanks are heated in a flat or planar condition on hot plates and when a sufficiently high temperature has been reached they are conveyed to a shell-shaped deep-drawing tool. Disposed at the open side of the tool is an edge which substantially completely encompasses the sunken region of the tool, and this edge engages the frame-like outer edge of the flat plastic panel by clamping it in such a way that the region inside the frame can be deep-drawn by deformation. This gives rise to a deep-drawn plastic shell which is open on one side and which is outwardly embraced by a seam disposed in one plane. A plastic half shell of this kind can be joined to a plastic shell oppositely disposed thereto.

It is true that during deep-drawing the plastic material is at a temperature required to seal the outer seam of the first plastic shell to that of the second plastic shell. However, as known, the deep-drawing tool is cooled so that the deep-drawn plastic bodies cool and solidify. To join two deep-drawn plastic shells together, it was therefore necessary to heat the plastic material further, at least in the region of the outer seam, in order to reach the required high sealing temperature. This additional heating process not only uses up energy but also time, thereby reducing the output and efficiency of the pack machines.

To overcome these problems, the aim of the invention is to improve the tool of the kind mentioned above so that the outer seam of a plastic shell, deep-drawn by the metal body of the tool, can be joined by sealing without the additional supply of heat.

SUMMARY OF THE INVENTION

This problem is solved according to the invention in that the edge of the metal body includes a heat insulating attachment which is fixed to the cooled metal body. The basic design of the tool can, and must, be kept similar to the prior art. In other words, the tool needs the shell-like metal body whose mold is outwardly embraced by the edge. However, in accordance with the teachings of the invention, a heat-insulating attachment is fixed to the edge at the open side of the tool metal body. Thus, an shell outer plastic seam located on the edge of the tool cool very slowly. The heat flow from the shell to the metal body is considerably reduced by the heat-insulating attachment, if not eliminated thereby.

The outer seam of the deep-drawn plastic shell thus retains its high temperature during the deep-drawing process. The same thing happens with another plastic shell which is oppositely disposed to the first shell. Both outer seams are then at a temperature which is suitable for effective sealing and they can be pressed together. The two outer seams of the shells can be joined together by sealing without supplying additional heat.

It is particularly expedient therein, if, according to the invention, the attachment is a frame-like panel manufactured from heat-insulating material. A panel of this kind can also be called a crosspiece or bar which is joined by rivets, screws or adhesive at the open side to the shell-like metal body of the tool. The crosspiece or bar can also be composed of a plurality of segments; and thus also the entire frame-like panel. The tool is ready when the attachment according to the invention has been placed in position. The tool is not only suitable for deep-drawing but for sealing open plastics shells, which, in other words, are produced by one and the same tool and are joined together by sealing.

Suitable heat-insulating materials are commercially available which can be used to manufacture narrow panels, angular panels and possibly panels which are contoured in a desired way, so that they can fit the open cross-piece sides of the metal bodies accurately. The outer seam of one shell can then be sealed to that of the other shell by being clamped between the two frame-like panels.

An alternative design of the invention is characterized in that the attachment consists of a first frame-like panel which is made of stainless steel, and of a second frame-like panel which is made of heat insulating material and which is arranged between the first panel and the metal body.

Admittedly, with this embodiment, a two-stage assembly has to be carried out. That is to say, the heat insulating second panel is located in the metal body and then the first panel made of stainless steel is located on the second panel. The second panel provides a very hard surface which is particularly advantageous if a specific contour is to be milled as well on the outside. In addition, stainless steel itself is a poor heat conductor. If the second panel of heat insulating material placed under the stainless steel is a thermosetting plastic, very good temperature insulation is provided. Therefore, the heat in the hot outer seam of the deep-drawn product cannot, practically speaking, escape into the cooled metal body.

The heat-insulating material for the afore-mentioned second frame-like panel can be in the form of Bakelite(trademark) material which includes thermosetting materials, e.g. phenolic plastics, amino plastics, epoxy resins, furan resins and polyester resins. These Bakelite materials are commercially available. By way of example, a Bakelite material of this kind can be in the form of a thin film adhesive which is sensitive to high temperatures, i.e., whose adhering properties vary only from 200° C. upwards. These types of thin film adhesives can be used to adhere stainless steel panels, e.g. with a double strip of adhesive. In this way, rivets or screws can advantageously be abandoned.

The heat insulting material of the frame-like panel is preferably a Teflon(trademark) bronze, wherein that material preferably is of uniform heat conductivity. A material of this kind consists of an admixture of bronze to Teflon and is commercially available. Frame-like panels of Teflon-bronze can be worked into any contour. If the intention is to fix the attachment according to the invention in the form of the frame-like panel to the cooled metal body without screws, rivets or adhesive, this is advantageously possible, e.g., by press fitting, wherein the inside of the frame-like panel of Teflon bronze is provided with a dovetail shape and the dovetail is forced into a corresponding groove.

The afore-mentioned heat insulating material of the frame-like panel, if it consists of a homogeneous material, can also be a heat-resistant, vulcanizable fluorine elastomer which is also resistant to chemicals, preferably being based on vinylidene fluoride hexafluoropropylene copolymerizates. This elastomer is commercially available under the trade mark Viton. A material of this kind which is also termed tool rubber can be of the desired cross-sectional contour to allow anchored regions on the side remote from the outer surface i.e., its inner surface to project inwardly into corresponding depressions in the metal body and for lateral displacement to be prevented. Even a panel of this kind can be constructed in segments. The tool rubber can be adhered reliably with epoxy adhesives, for example. In the case of Viton rubber, 90° Shore hardness has been shown to be desirable. The surface of a Viton rubber of this kind which comes into contact with the outer seam to be sealed can advantageously be smoothed over after it has been adhered to a metal body.

Another suitable embodiment of the tool according to the invention is characterized in that the attachment has at least one outwardly upstanding region of increased height on at least part of the length of the frame-like panel. For economical manufacture of plastic packs it is preferable if plastic half shells are deep-drawn in pairs so that the opening of one shell comes to lie directly at the opening of another shell. This "mouth to mouth" arrangement facilitates the deep-drawing operation in a particularly surprising manner, since the outer seam of the pack embraces the pair of plastics shells in closed manner and so it is still possible to deep draw a pack with a large opening. The pairs of half shells, or, after oppositely disposed shells are joined, the pairs of packs, must then be separated from each other. To separate them it can be expedient to form a groove in the plastics material during deep-drawing, and this is expediently done by an upstanding rib being provided on the tool. For this reason it is desirable if the attachment has an outwardly upstanding region of increased height in the afore-described way, either in the form of a continuous rib or in the form of a chain of raised points or the like. These profiles of the frame-like panel can be provided both with the embodiment of the homogeneous attachment and also with the embodiment of the attachment composed of two materials.

It can be particularly expedient if the invention is further designed such that at least one of the frame-like panels is composed of segments. It has already been mentioned hereinabove that the frame-like panel can be formed from heat insulating material or that the other frame-like panel which may consist of stainless steel, for example, can be composed not of one piece but of many pieces. These pieces are called segments of which one or both panels can be composed to form a frame. This can be particularly effective if the shell-like metal body has a considerably different coefficient of thermal conductivity, from the material of the frame-like panel or segments. Apart from the fact that it can be economically more favorable and technically more simple to shape a frame-like panel according to the preceding description by juxtapositioning segments, the heat expansion of the various materials which are fixed to each other can be balanced better by using segments. Undesirable mechanical stresses can be advantageously avoided by small gaps between the individual segments. As with bimetals, the frame-like panel on the metal body could bend due to variable heat expansion. The small gaps between the individual segments are excellent compensation for varying heat expansion.

It is also expedient with a preferred embodiment if the second frame-like panel of heat insulating material is at the most half as thick as the first frame-like panel which is made of steel, for example.

With respect to the thickness of the attachments according to the invention, with the first embodiment where the attachment is made of a homogeneous material it has been seen to be favorable if the thickness of the attachment in the form of the panel is 0.5 to 2 mm, preferably 1 mm, for a deep-drawing tool for packs for liquids having a ¼ litre capacity.

If this size of tool is used as the basis for the other embodiment, where the attachment consists of panels made of two different materials, then with one particularly preferable embodiment the thickness of the panel of stainless steel is 1.2 mm, whereas the panel made of the heat insulating material which could also be a Teflon foil is about 0.5 mm in thickness.

From the preceding embodiments the skilled person will see that the attachment at the edge of the cooled metal body should be as thin as possible so that the surface hardness provided is sufficient for sealing and possibly also for shaping the plastic product, and also to provide a barrier for heat flow from the hot outer seam to the cooled metal body; and additionally the metal body should be cooled as much as possible so that with the exception of the outer seam as much as possible of the deep-drawn body of the plastic product can be cooled and hardened.

Basically, the skilled person will see that the thickness of the so-called first frame-like panel can be varied according to its material from the so-called second frame-like panel. For example, if the sealing temperature is to be increased, then it is expedient to make the frame-like panel of heat insulating material thicker, thus thicker than the preferred embodiment mentioned above. If the sealing temperature is obtained very easily due to the particular the design of the tool is provided, then the heat insulating layer can be thinner, for example half as thick as the first steel panel placed on the outside. The heat insulating panel is used to allow heat to be stored for use during the sealing process. Nonetheless, the skilled person will constantly endeavour to keep the temperature as low as possible since the deep-drawn material can be cooled better and more quickly. Therefore, the optimum conditions are often empirically looked for and by varying the thickness of the heat insulating panel and the thickness of the metal panel placed on it. The thinner the metal panel which is placed at the open side, the stronger the reaction of the heat insulating layer under it, and the heating capacity for the localization of heat is less.

The above features according to the invention advantageously serve to exploit the residual heat from the deep-drawing operation of the plastic molded article; Therefore, two plastic shells can be both deep-drawn and removed from the mold with one and the same tool, and their outer seams can also be sealed together.

Further advantages, features and possible applications of the present invention will emerge from the following description of preferred embodiments in conjunction with the drawings, and the appended claims.

DETAILED DESCRIPTION OF THE INVENTION

Figure 3:
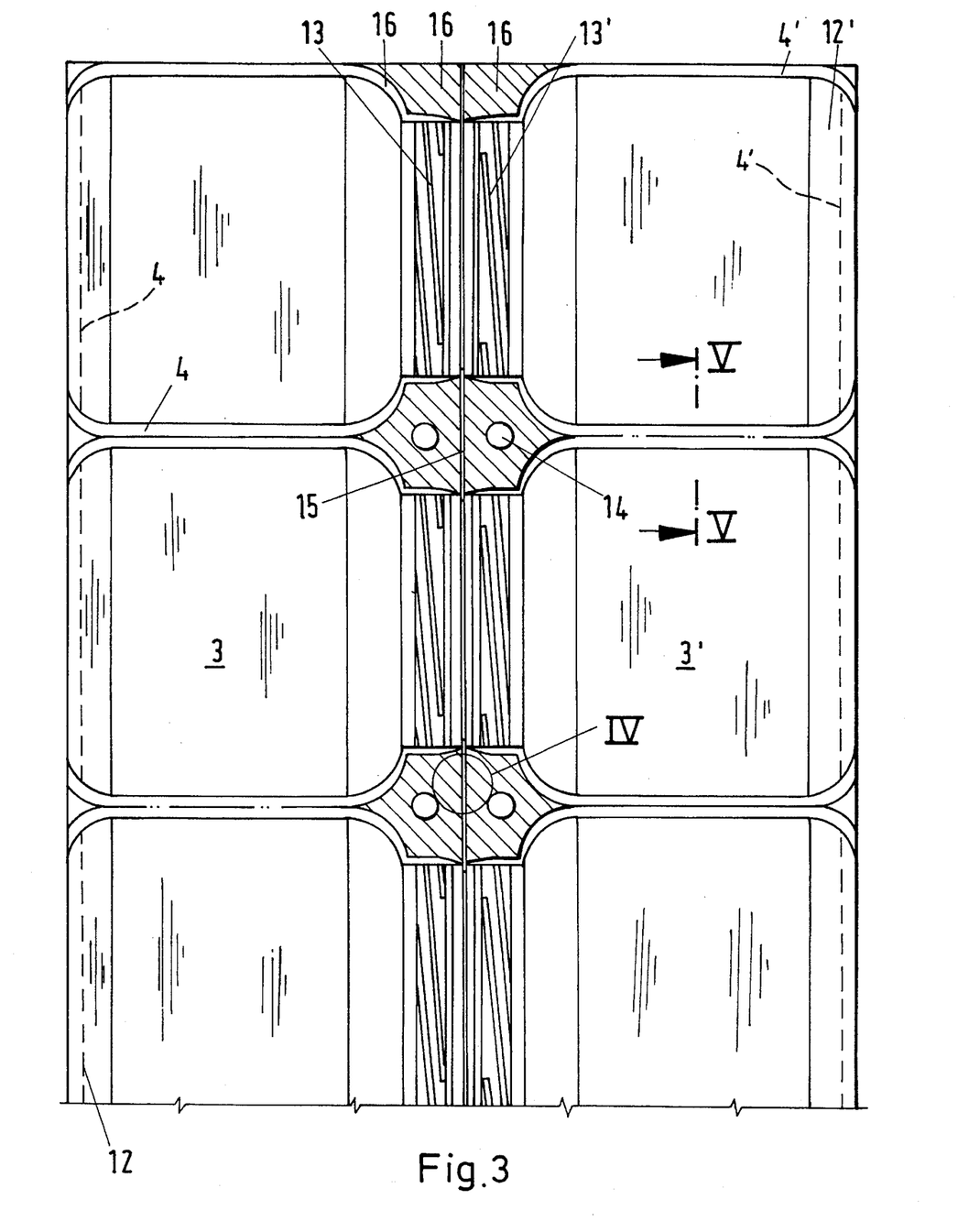
FIG. 3 is a plan view of three pairs of deep-drawing tools, viewed from the open side, wherein the bottom pair is broken away.

With the present invention, a machine is provided for heating, deep-drawing and sealing together plastic half shells. After the shells have been sealed together, packs for liquids are produced which have tubular side walls; a bottom and a top wall of each pack, a pouring opening is arranged in the top wall. A seam, also called a weld seam, is disposed in a plane parallel to the longitudinal central axis of the ready pack. This seam encompasses the pack. That is to say, the outer seam associated with each shell-like half and encompasses it. With the ready pack, this outer seam passes along the bottom along a depression, so that viewed as a whole the bottom is substantially flat, without the outer seam being destroyed. In the top, the seam is interrupted by the afore-mentioned pouring opening, which, on the outside, has an upstanding collar. The tool shown in FIG. 3 is used to produce a pack for liquids having a threaded collar. This outer seam projects as far as the upper free edge of the collar and the latter part tapers towards it. With the pack the two flange-like outer seams of the pair of molded plastic halves form the afore-mentioned seam on the pack. With the tool shown in FIG.3, three pairs of half shells are formed simultaneously. The plastic products which can be produced with the tool shown in to FIG. 3 are sealed together so that three pairs of closed packs are produced which are then separated and thus opened in the middle where the two shoulders abut each other.

Figure 1:
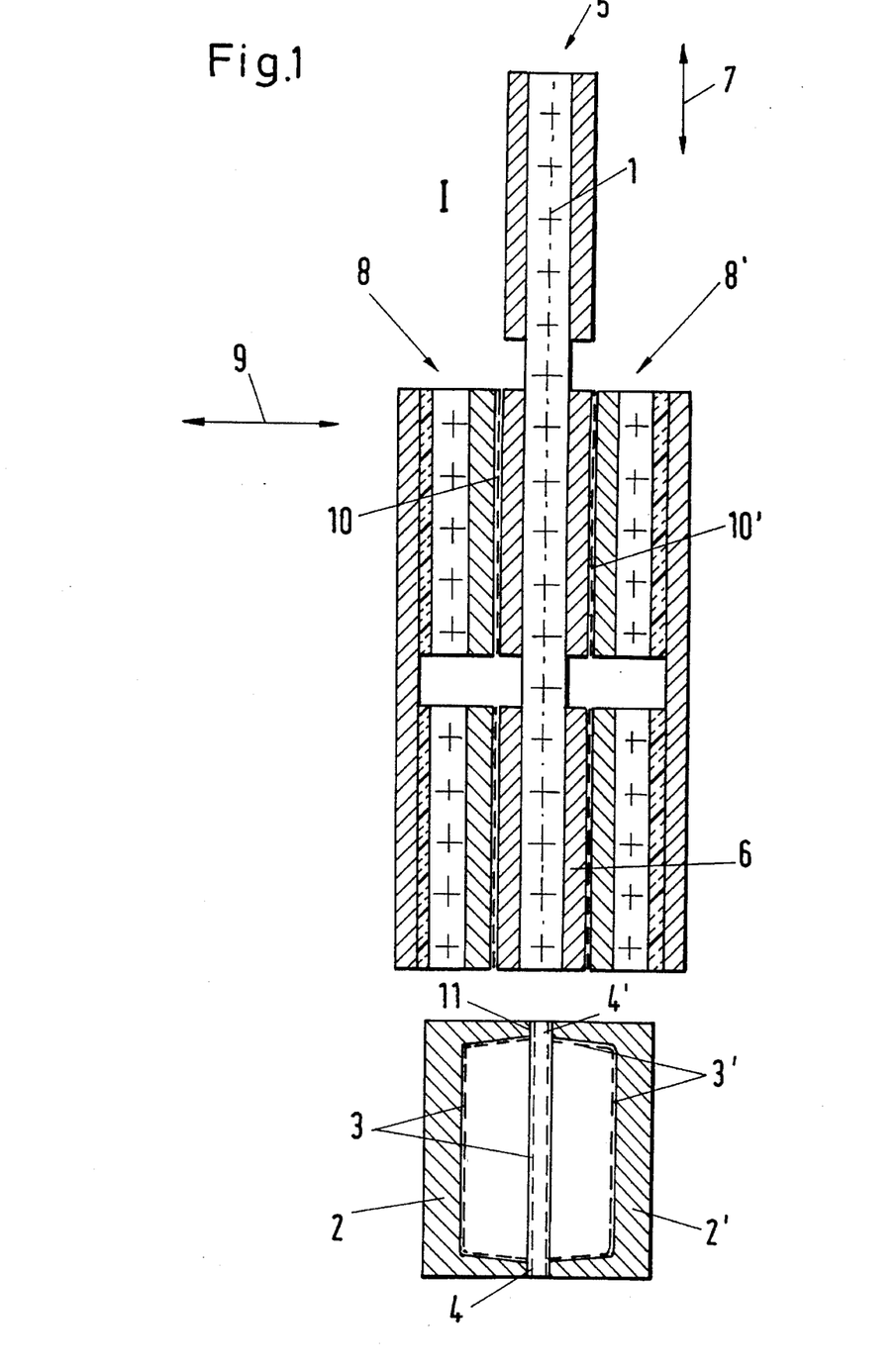
FIG. 1 is a schematic cross sectional of a view deep-drawing heating, and sealing apparatus according to the present invention.

FIG. 1 shows schematically the heating-and deep-drawing machine of the present invention which can be used to mold one single half shell which is open at the pouring end. Shown symmetrically to the plane of symmetry 1 in FIG. 1 are a shell-like metal body 2 arranged at the left and a corresponding metal body 2' at the right in the form of a deep-drawing tool, in each of which an open plastic half shell 3 or 3' which has already been deep-drawn is marked by broken lines together with its flange-like outer seam 4, 4'. The shape of the pouring opening is not shown in FIGS. 1 and 2, for FIGS. 1 and 2 only give basic and schematic representations of the machine and its mode of operation.

Disposed centrally above the deep-drawing tools and metal bodies 2, 2', is the central main heating panel 5 which carries three spaced apart pairs of main suction panels 6. The panel 5 is movable in the direction of the two-directional arrow 7 vertically relative to the shell-like metal bodies 2, 2' of the deep-drawing tools. With another embodiment, the main heating panel 5 can also be moved horizontally from the front to the back and vice versa.

When the main heating panel 5 is in the top position, as shown in FIG. 1, in the embodiment shown and described here, heating suction panels 8 and 8' are disposed adjacent its bottom region next to the two lower pairs of main suction panels 6. Panels 8 and 8' are movable backwards and forward and horizontally to the right and left in a direction perpendicular to the plane of symmetry 1, in the direction of the arrow 9, in such a way that the plastic panel 10 or 10' to be heated, which are shown in FIG. 1 by broken lines, can be pressed against the oppositely disposed main suction panel 5. The two shell-like metal bodies 2 and 2' can be moved in the direction of the two-directional arrow 9 perpendicularly to the plane of symmetry 1 until the main heating panel 5 can move down between the metal bodies 2, 2' and can be held there, wherein the top and bottom edges of the metal bodies 2, 2' then coincide with the top and bottom edges of the lower-most main suction panels 6.

During operation, this machine operates in such a way that plastics panels 10, 10', which are made of deep-drawable plastic material of appropriate outward dimensions, in the top-most position I in FIG. 1, are pressed against the top main suction panels 6 and are held by them by suction.

Figure 2:
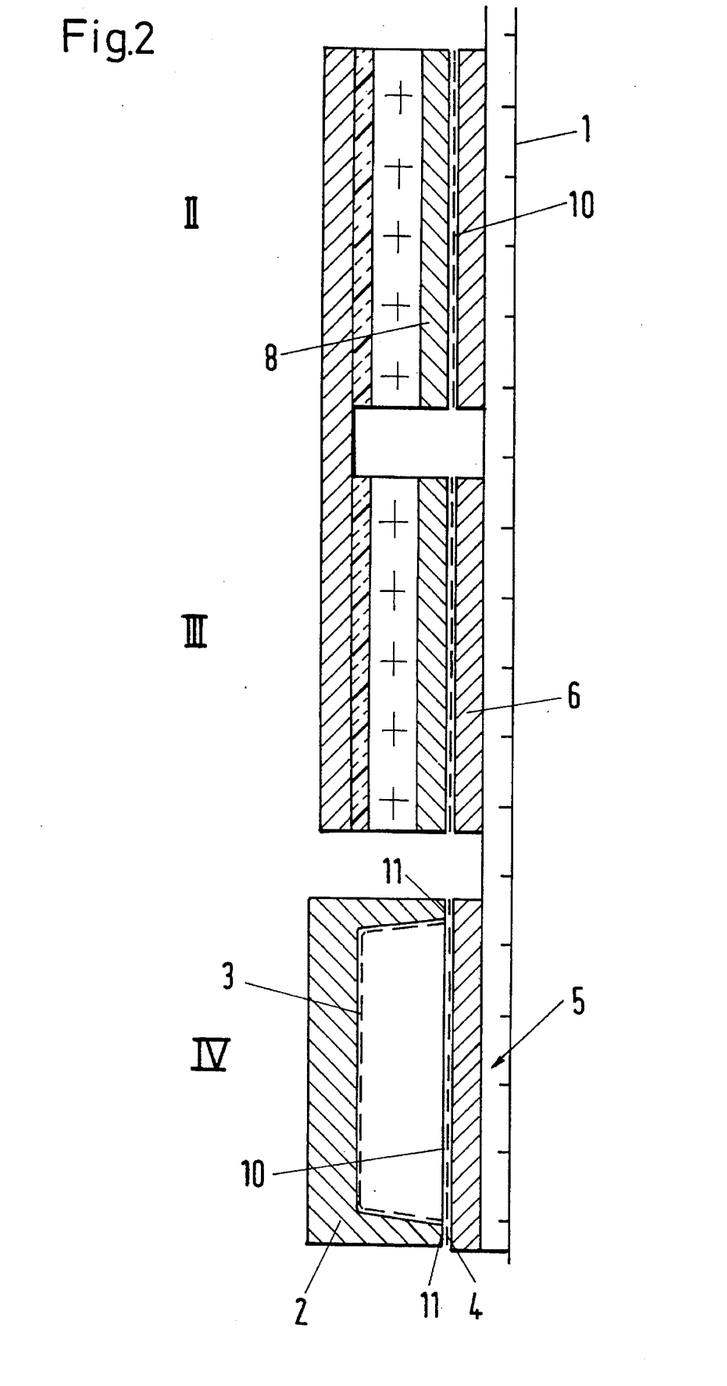
FIG. 2 is a similar view, on a larger scale, of the left-hand part of the apparatus shown in FIG. 1.

In Position I the plastics panels 10, 10' are heated and in the heated condition are conveyed downwardly into the position II shown in FIG. 2, after the shell-like metal bodies 2, 2' have moved apart outwardly.

FIG. 2 shows only the left half of the machine next to the plane of symmetry 1 for the sake of simplicity, since the apparatus and processes on the right-hand side are the same. Each of the horizontally movable heating suction panels 8 takes possession of a heated plastic panel 10 in Position II and later in Position III by vacuum such that the plastic panel 10 is repelled by the main suction panel 6 and is attracted by the horizontally movable heating suction panel 8. The horizontally movable heating suction panels 8 are responsible for further heating the plastic panel 10. If the main heating panel 5 moves vertically upwards again, it is empty in the top-most position I so that a new cold plastic panel can be received; and in the bottom positions II and III it is likewise empty so that it can receive a plastics panel 10 which has been intermediately heated by the horizontally movable heat suction panel 8 respectively opposite to it.

This transition always takes place in such a way that each horizontally movable heating suction panel 8 is moved away from its respective position shown in FIGS. 1 and 2 horizontally to the left or right in the direction of the arrow 9, while it carries a plastic panels 10 to be heated; and after the main heating panel 5 has moved vertically, it is moved back horizontally to the plane of symmetry 1.

Thus, for example, in Position III, the heated plastic panel 10 at the position is transferred to the main heating panel 5 and is heated further, wherein care should be taken to ensure that the bottom-most of the three main suction panels 6 is in Position III in this operational state.

The horizontally movable heating suction panel 8 then moves away again to the left, and the plastic panel 10 which was heated to the highest temperature provided for it is moved vertically downwards into Position IV.

In Position IV, the metal body 2 moves horizontally in the direction of the arrow 9 to the plane of symmetry 1 and clamps the plastic panel 10 firmly between the flat edge 11 of the metal body 2 and the bottom-most main suction panel 6. Deep-drawing then takes place which results in the open plastic shell 3 being formed from the originally flat plastic panel 10. The flange-like outer seam 12, the subsequent sealing seam, is clamped and still lies in the plane of the earlier plastics panel 10.

After deep-drawing the metal body 2 which is cooled (by means not shown) is opened or is moved away from the bottom-most main suction panel 6 horizontally to the left in the direction of the arrow 9 so that the main heating panel 5 can be raised up vertically in the direction of the arrow If the two cooled metal bodies 2, 2' are spaced apart, the two bodies 2, 2' move toward the plane of symmetry 1 toward each other so that the position shown to the bottom of FIG. 1, is reached. The flange-like outer seams 4, 4', which are still warm are pressed together, and the two open plastics shells 3 are sealed to form the afore-described unit, i.e. a pack. The outer seam 4 of the open half shell 3 is therefore joined by sealing to the outer seam 4' of the half shell 3' which is placed against it. This is done by one and the same tool, namely, by the shell-like metal bodies and 2', without additional heat having to be supplied.

The edge 11 at the open side of the metal body 2 is not shown in FIGS. 1 to 3, but it will be described hereinafter in connection with the description of FIGS. 4 to 8.

The main design and mode of operation of the machine and of the tools for deep-drawing and sealing the plastics shells 3 have now been described with reference to FIGS. 1 and 2.

FIG. 3 shows a plan view of the open plastic shells 3, 3' which are identical in appearance to the shell-like metal bodies 2, 2' except for the bottom part 12. However, at the bottom part 12, 12', the flange-like outer seam 4, 4' appears as a broken line. With the embodiment of the tool according to FIG. 3 it can be seen that the shoulders 13, 13' are joined together.

The edge portions 16 which are later stamped out are disposed on either side of the rib 15 in the region of the ejector pins 14.

Figure 4:
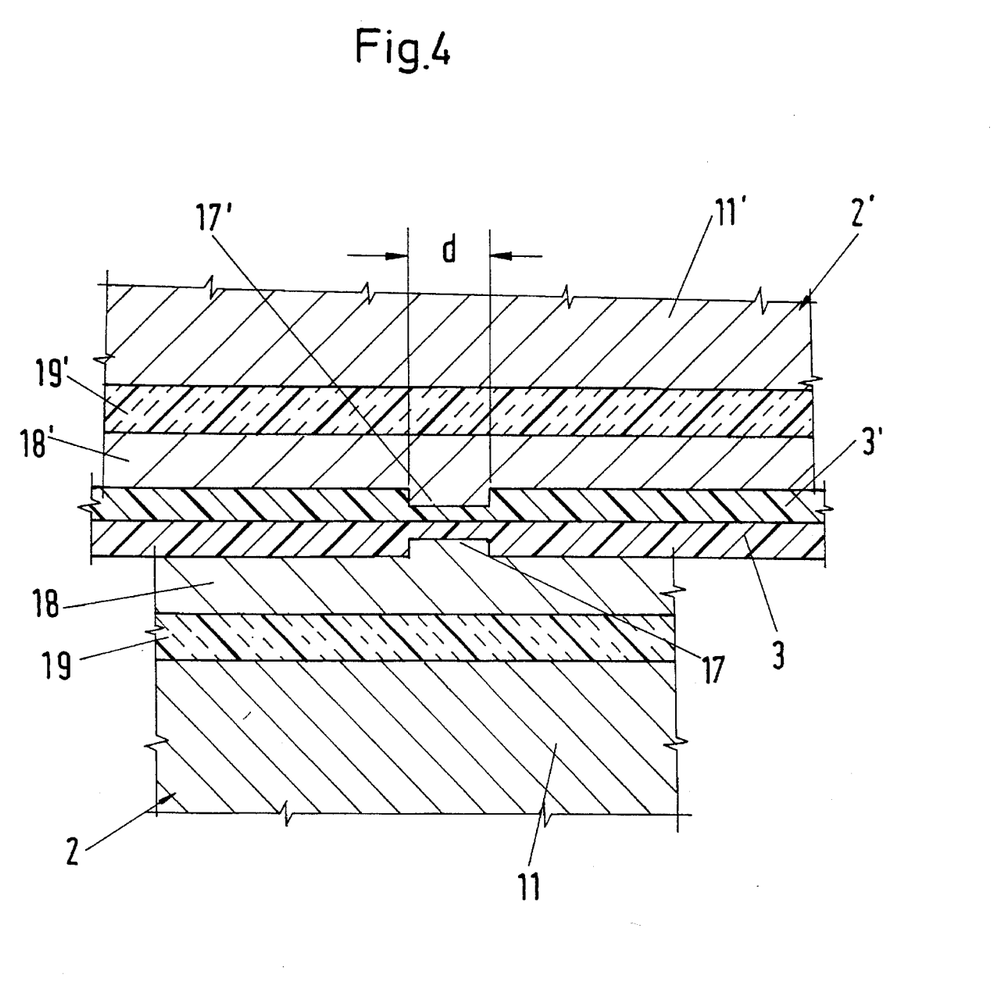
FIG. 4 is a sectional view on a larger scale of the detail in the circle IV, marked by a line in FIG. 3.

FIG. 4 shows a broken away cross-sectional view, looking at the unit marked by the broken circular line IV (bottom of FIG. 3). In the center it is possible to see the plastic material of the open shell 3 from the right to the left and of the open shell 3' above it, wherein in the center the desired necking can be seen. This is produced by the outwardly projecting raised region 17, 17' of increased height on the attachment 18, 18' of the tool.

Figure 7:
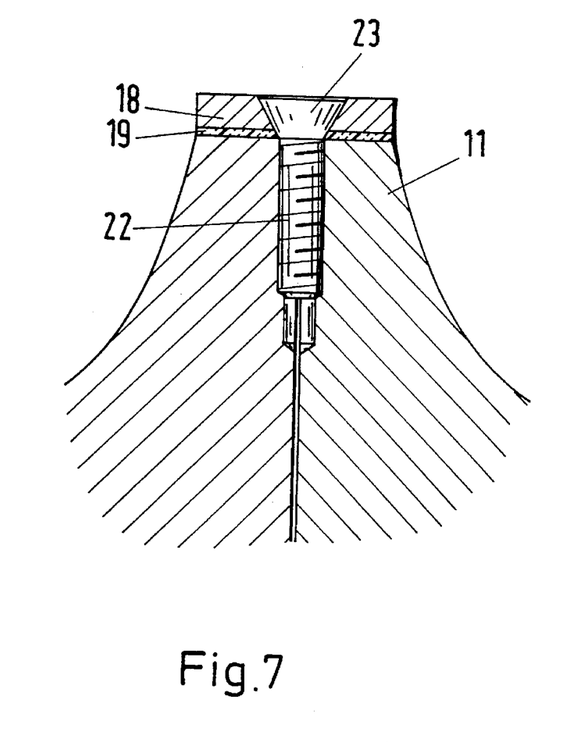
FIG. 7 is another embodiment of an attachment with its fixture.

With the embodiment in FIGS. 4 and 7, an attachment 18, 19 (or 18', 19') is fixed to the edge 11, 11' of the metal body 2, 2' which is preferably made of aluminium, and this attachment is composed of two parts which correspond to the shape of the outer seam 4, 4' and which therefore look like a frame-like panel. The shape of both frame-like panels 18 and 19 (or 18', 19') is the same. The first frame-like panel 18 is made of stainless steel. Arranged between this panel and the edge 11 of the metal body 2 is the second frame-like panel 19 which is made of a heat-insulating material, e.g. Teflon™ and Bakelite(trademarks), as already described hereinabove. This second heat-insulating panel 19 is responsible for ensuring that the residual heat in the plastic material of the shell 3 (in the region of its edge) only heats the thin second panel 18 and does not flow into the cooled metal body 2.

In FIG. 4 the second frame-like panel 19 made of the heat-insulating material is shown to be almost as thick as the first frame-like panel 18 made of stainless steel. This ratio can be varied in the case of the embodiment of the attachment according to FIGS. 4 and 7 where the attachment is composed of two parts. By way of example, the heat insulating panel 19 can be only 0.5 mm in thickness, whilst the first panel 18 made of stainless steel is 1.2 mm thick. In this case, for heat technology related reasons it is desirable to heat the steel body 18 which is of somewhat large volume. In other instances where the heat insulating properties of the second insulating panel 19 are to play a larger part, the thickness ratios are set roughly as in the drawing in FIG. 4 so that both parts 18, 19 of the attachment 18 are about the same thickness.

Figure 5:
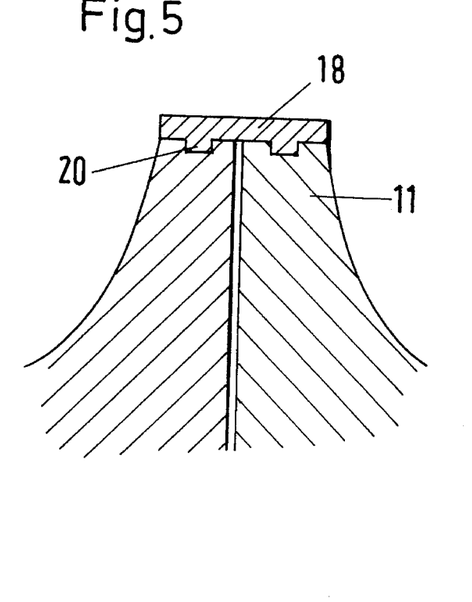
FIG. 5 is a broken away cross-sectional view along the line V—V in FIG. 3, FIG. 6 a cross-sectional view, broken away, but of another embodiment of an attachment.
Figure 6:
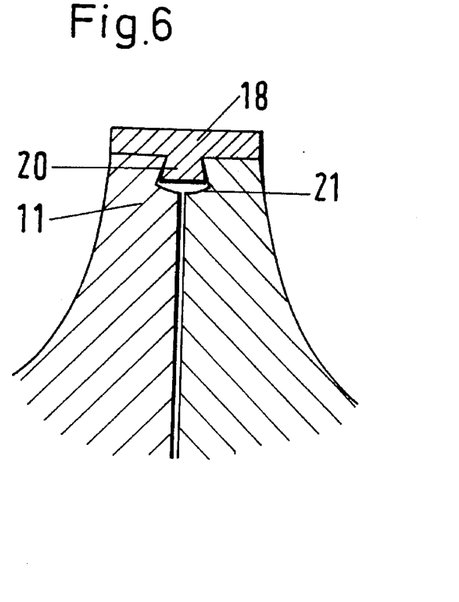

If the topmost surface on which the plastic material of the shell 3 comes to lie does not have a sharp-edged contour, the attachment 18, as shown in FIGS. 5 and 6, can consist of one single part, i.e. of a frame-like panel made of a heat-insulating material.

In FIG. 5, the edge 11 of two adjacent shell-like metal bodies 2 is shown in section, corresponding to the view V—V in FIG. 3. This attachment 18 can be provided with anchoring ribs 20 which project downwardly into the edge 11, as with the other embodiment in FIG. 6. With the embodiment in FIG. 5, the heat-insulating material is the afore-mentioned Viton-rubber and is adhered to the edge 11, for example using an epoxy adhesive. This material can be smoothed after it has been adhered to the metal body 2.

With the other embodiment, shown in FIG. 6, the heat-insulating material is a Teflon bronze with a dovetail profile, wherein the dovetail according to FIG. 6 projects downwardly into a depression in the edge 11 of the tool. During assembly it can be sufficient to deform this dovetail connection and to press the anchoring rib 20 into the depression 21 shown, without sticking.

With the embodiment in FIG. 7, the pairing of materials is described in connection with FIG. 4. FIG. 7 shows the fastening of the two frame-shaped panels 18 and 19 to the edge 11 of the metal body 2. A countersunk screw 22 is screwed in to such a depth that the surface of its head 23 is flush with the surface of the steel portion 18.

Figure 8:
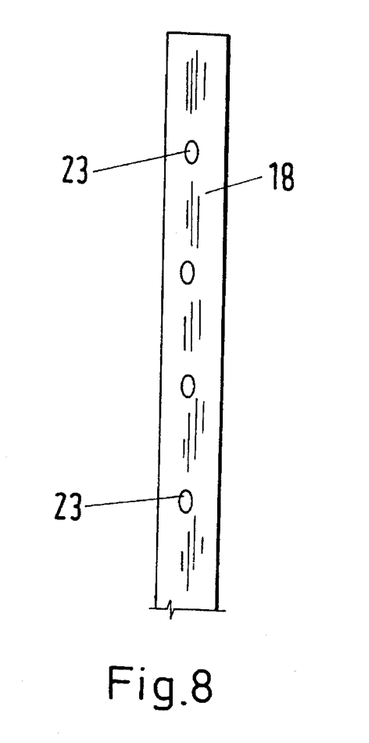
FIG. 8 is a plan view, broken away, of a straight portion of a frame-like panel of stainless steel.

FIG. 8 is a plan view of a broken away straight portion of the first panel 18 showing screw heads 23. This drawing makes it easy to imagine the way in which the entire frame of the single attachment 18 is composed of individual segments which one after the other give the frame shape, but between them there are gaps to allow for varying extension in length during heating. Therefore it is advantageously possible to prevent the attachment 18 from buckling between two points of fixture since the first panel made of steel or the like expands more than the metal body 2 on which it is fixed. A flat support surface is advantageously always provided by virtue of the segmented structure of the frame-like panel.

We claim:

1. A tool for use in deep-drawing and sealing plastic shells comprising:
    at least one metal body having a substantially flat edge and an attachment located along at least a portion of said flat edge, said attachment including a first panel made of metal and a second panel made of a heat insulating material and located along said portion of the edge, said first panel being attached to said second panel such that said second panel is interposed between said first panel and said edge.

2. A tool according to claim 1, wherein the heat insulating material is a Teflon bronze or a vulcanizable fluorine elastomer based on vinylidene fluoride-hexafluorine propylene copolymerizate.

3. A tool according to claim 1, wherein the attachment has at least one raised region.

4. A tool according to claim 1, wherein at least one of the panels is composed of segments.

5. A tool according to claim 1, wherein the second panel of heat insulating material is at the most half as thick as the first panel.

6. A tool as set forth in claim 1, wherein said first and second panels have a frame shape and said first panel is formed from stainless steel.

7. A tool for use in deep-drawing and sealing plastic shells comprising:
    first and second metal bodies each having a substantially flat edge and an attachment located along at least a portion of said flat edge, said attachment including a first panel made of metal and a second panel made of a heat insulating material and located along said portion of the edge, said first panel being attached to said second panel such that said second panel is interposed between said first panel and said edge.

* * * * *

UNITED STATES PATENT AND TRADEMARK OFFICE
CERTIFICATE OF CORRECTION

PATENT NO.  : 5,536,163  
DATED       : July 16, 1996  
INVENTOR(S) : Wilhelm Reil, Heiko Bub Page 1 of 2

It is certified that error appears in the above-indentified patent and that said Letters Patent is hereby corrected as shown below:

Column 1, line 24, after "deep-drawing", insert --,--.

Column 2, lines 12 & 13, "the open cross-piece sides of the" should read --to--.

Column 4, line 41, "article;" should read --article.--.

Column 4, lines 53-55, "FIG. 1 is a schematic cross sectional of a view deep-drawing heating, and sealing apparatus according to the present invention, should read --FIG. 1 is a schematic cross sectional view of a heating, deep-drawing and sealing apparatus according to the present invention,--.

Column 4, line 66, delete "but".

UNITED STATES PATENT AND TRADEMARK OFFICE
CERTIFICATE OF CORRECTION

PATENT NO. : 5,536,163
DATED : July 16, 1996
INVENTOR(S) : Wilhelm Reil, Heiko Bub It is certified that error appears in the above-indentified patent and that said Letters Patent is hereby corrected as shown below:

Column 5, lines 12 & 13, after ";" please change to read --a bottom and a top wall. A pouring opening is arranged in the top wall of each pack.--.

Column 6, line 57, after "arrow" insert --7.--.

Column 6, line 59, "to" should read --in--.

Column 6, line 66, after "bodies" insert --2,--.

Signed and Sealed this

Twenty-first Day of January, 1997

Attest:

BRUCE LEHMAN

Attesting Officer  Commissioner of Patents and Trademarks